US005513867A

United States Patent [19]

Bloswick et al.

[11] Patent Number: 5,513,867

[45] Date of Patent: May 7, 1996

[54] SEAT-LIFT WHEELCHAIR

[75] Inventors: Donald S. Bloswick, Salt Lake City, Utah; Ben D. Shirley, Gallup, N.M.; Eric M. King, Midvale, Utah

[73] Assignee: University of Utah, Salt Lake City, Utah

[21] Appl. No.: 110,844

[22] Filed: Aug. 24, 1993

[51] Int. Cl.[6] ....... B60N 2/10

[52] U.S. Cl. ....... 280/250.1; 280/304.1; 297/330; 297/339; 297/DIG. 10

[58] Field of Search ....... 280/250.1, 304.1; 297/DIG. 10, 330, 327, 313, 326, 339, 316; 414/921; 267/64.12, 64.16, 64.22; 188/2 F; 296/65.1

[56] References Cited

U.S. PATENT DOCUMENTS

| | | | |
|---|---|---|---|
| 974,769 | 11/1910 | Hoff | 297/316 |
| 2,091,088 | 8/1937 | Whedon et al. | 297/329 |
| 2,268,914 | 1/1942 | Vandervoort | 297/332 |
| 2,442,303 | 5/1948 | Mayfield | 297/332 |
| 3,023,048 | 2/1962 | Barton | 297/330 |
| 3,954,195 | 5/1976 | Deuchar | 214/82 |
| 4,519,649 | 5/1985 | Tanaka et al. | 297/316 |
| 4,538,853 | 9/1985 | Levenberg | 297/339 |
| 4,569,556 | 2/1986 | Pillot | 297/316 |
| 4,573,736 | 3/1986 | Levenberg | 297/339 |
| 4,623,194 | 11/1986 | Pillot | 297/316 |
| 4,632,455 | 12/1986 | Schiller et al. | 297/326 |
| 4,743,065 | 5/1988 | Meiller et al. | 297/316 |
| 4,838,612 | 6/1989 | Cross | 297/DIG. 10 |
| 4,907,303 | 3/1990 | Baird | 4/480 |
| 4,929,022 | 5/1990 | Geraci | 297/313 |
| 4,979,726 | 12/1990 | Geraci | 297/313 |
| 5,011,224 | 4/1991 | Paul | 297/339 |
| 5,027,446 | 7/1991 | Robertson | 297/DIG. 4 |
| 5,054,852 | 10/1991 | Tholkes | 297/DIG. 10 |
| 5,096,008 | 3/1992 | Mankowski | 180/6.5 |
| 5,108,202 | 4/1992 | Smith | 297/330 |
| 5,115,723 | 5/1992 | Wang | 267/64.12 |
| 5,195,803 | 3/1993 | Quintile | 297/DIG. 10 |
| 5,224,750 | 7/1993 | Clark et al. | 297/DIG. 10 |
| 5,333,931 | 8/1994 | Weodendorf | 297/DIG. 10 |

OTHER PUBLICATIONS

Promotional brochure, The Booster, Levenberg, U.S. Patents.

Design News, Jan. 4, 1993, pp. 89, 90, "Wheelchair Can Raise and Lower Users," Charles J. Murray.

Homecare, Jun. 1990, pp. 17, 18, 48 , Jun. 1990.

*Primary Examiner*—Anne Marie Boehler
*Attorney, Agent, or Firm*—Prince, Yeates & Geldzahler

[57] ABSTRACT

A wheelchair includes a seat that pivots forward to assist the user in exiting and entering the chair. The seat is biased toward its forward or up-right position by mechanical springs having force adjustments for user adjustment of the seat-lift force. One embodiment includes a cam mechanism for varying this seat-lift force as the seat is being raised. A closed-loop hydraulic cylinder and piston actuator system is provided to (1) damp the spring action as the seat is raised and lowered, (2) control the rate of seat ascent and descent, and (3) permit the user to stop and lock the seat in any position between the horizontal and up-right positions. This closed-loop hydraulic system includes a manual control valve for user-control of the seat raising and lowering, and a user-adjustable flow rate control valve for limiting seat ascent and descent speeds.

29 Claims, 12 Drawing Sheets

SEAT-LIFT WHEELCHAIR

BACKGROUND OF THE INVENTION

1. Field of the Invention

The present invention relates to wheelchairs, and more specifically to a wheelchair having a seat-lift mechanism to (1) assist the user in getting out of the wheelchair, and (2) enable the user to adjust the position of the seat in an infinite number of positions between the conventional horizontal seat position and an up-right position.

2. Description of the Prior Art

A number of chairs, including wheelchairs, incorporate seat-lift mechanisms for assisting users out of the chairs. One such wheelchair system utilizes a hydraulic jack having a reciprocal-type lever that is used to "pump" the hinged seat and back from the horizontal position to an up-right position. Another seat-lift wheelchair incorporates a motorized power screw to raise the hinged seat and back upward and forward to permit the user to exit the wheelchair. A number of other prior art patents disclose springs and lever and/or pulley mechanisms for spring-biasing the chair seat from its horizontal position to an up-right position.

SUMMARY OF THE INVENTION

A seat-lift wheelchair has a seat that pivots adjacent the front edge near the user's knees. Adjustable spring force biases the seat from the conventionally horizontal position to an up-right, near-vertical position to assist the user in exiting the wheelchair. One embodiment also includes a cam mechanism for varying the force (torque) for lifting the seat from its horizontal to its up-right position. The seat-lift mechanism also includes a closed-loop hydraulic extension cylinder and associated control system. The multi-purpose hydraulic cylinder functions to (1) damp the spring action as the seat is raised and lowered, (2) control the rate of rise of the seat, and (3) permit the user to stop and "lock" the seat in any position between its horizontal and up-right positions.

The wheelchair includes a fingertip control valve to permit the user to actuate the extension cylinder to permit raising and lowering of the seat, and to stop and "lock" the seat in any position between its horizontal and up-right positions. The hydraulic system also includes an adjustable bi-directional check valve in series with the hydraulic cylinder and control valve that permits the user to adjust the maximum rates of ascent and descent of the seat, independently of each other, to suit his personal preference.

DETAILED DESCRIPTION OF THE INVENTION

Figure 1:
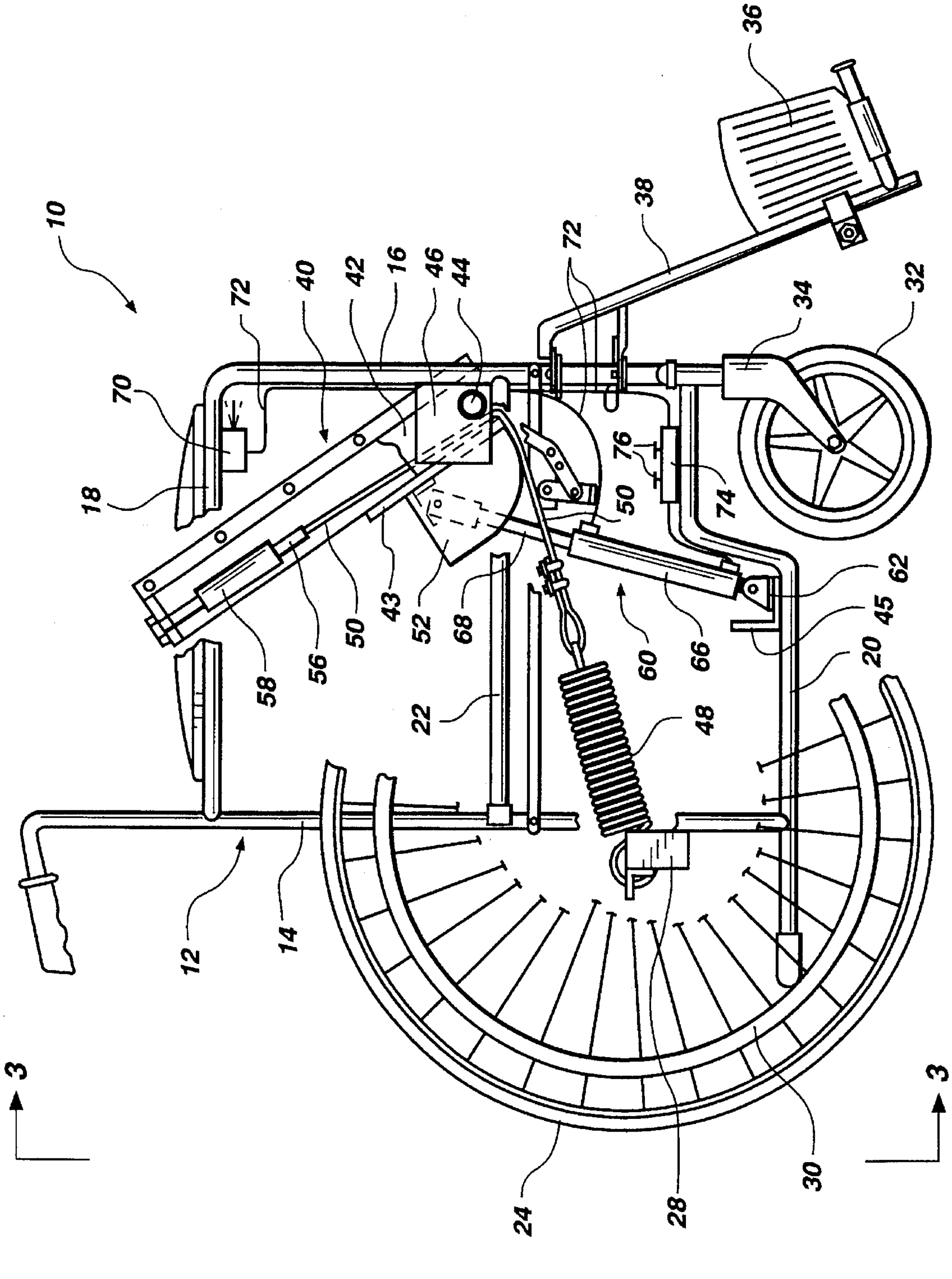
FIG. 1 is a side elevational view of a first embodiment of the seat-lift wheelchair of the present invention illustrating the spring, cable, and cam mechanism for raising the seat.

It is believed that a brief explanation of convention would be helpful to aid the reader in correlating the detailed description with the drawings. In this regard, inasmuch as many of the components of the various embodiments of the wheelchairs described herein are either identical or symmetric about a vertical plane of symmetry through the wheelchair center, being either on the right-hand side or left-hand side, these identical/symmetric components will be indicated by identical reference numerals for purposes of simplicity with regard to the symmetry of said elements and components.

FIG. 1 shows a first embodiment of the seat-lift wheelchair of the present invention in side elevation, generally indicated by the numeral 10. This wheelchair comprises symmetric side frame members 12, generally constructed of tubular metal frame pieces fashioned and constructed together to form the side frame members. Each of these side frame members includes symmetric rear vertical structural elements 14, front vertical elements 16, horizontal arm rest structures 18, lower horizontal structural members 20, and intermediate horizontal structural members 22, which in conventional wheelchairs, also serve as the support bars for the typically fabric seat portion.

FIG. 1 also illustrates the right-side drivewheel 24, rotatably mounted on its respective structural rear vertical element 14 at axle 26 (omitted in FIG. 1 for clarity). The drivewheel 24 includes a smaller hand-wheel 30 for self-propulsion. Also included are symmetric front support/turning wheels 32, pivotally mounted to respective front vertical elements 16 at pivot joint 34, in a customary manner. Lastly, the seat-lift wheelchair 10 includes customary symmetric foot supports 36 and support brackets 38, adjustably attached to respective front vertical elements 16 in a customary manner to provide support for the user's feet and legs, if desired.

In addition to a few other elements more clearly shown in subsequent drawing figures (fabric back support, transverse scissor collapse mechanism, etc.), the preceding is a general, non-detailed description of a conventional collapsible wheelchair.

The seat-lift wheelchair 10 of the present invention incorporates a manually controllable, spring-assisted seat-lift mechanism that (1) assists the user in getting in and out of the wheelchair, (2) provides a rear support for the user while standing, and (3) permits the user to lock the seat in an infinite number of positions between the normal horizontal position and the up-right exit-assist position. This seat-lift mechanism incorporates a generally planar modified seat 40 having symmetric side support members 42, each being pivotally connected at axle 44 to respective side frame members 12. In this regard, respective seat pivot support plates 46 are attached to the side frame members 12, and more specifically to the front vertical elements 16 and the intermediate horizontal structural members 22. Seat pivot support plates 46 receive therein the seat pivot axles 44 in axial alignment in a manner to permit the two seat side support members 42 to pivot together about the concentric seat pivot axles 44 between an up-right position, as shown in FIG. 1 and the normal horizontal position.

The modified seat 40 is biased into its up-right position by the action of symmetric coiled tension springs 48 acting through cables 50 which wrap around cams 52 and terminate in respective threaded shafts 56 of turnbuckles 58 for providing tension adjustment of the springs acting on the modified seat.

Figure 2:
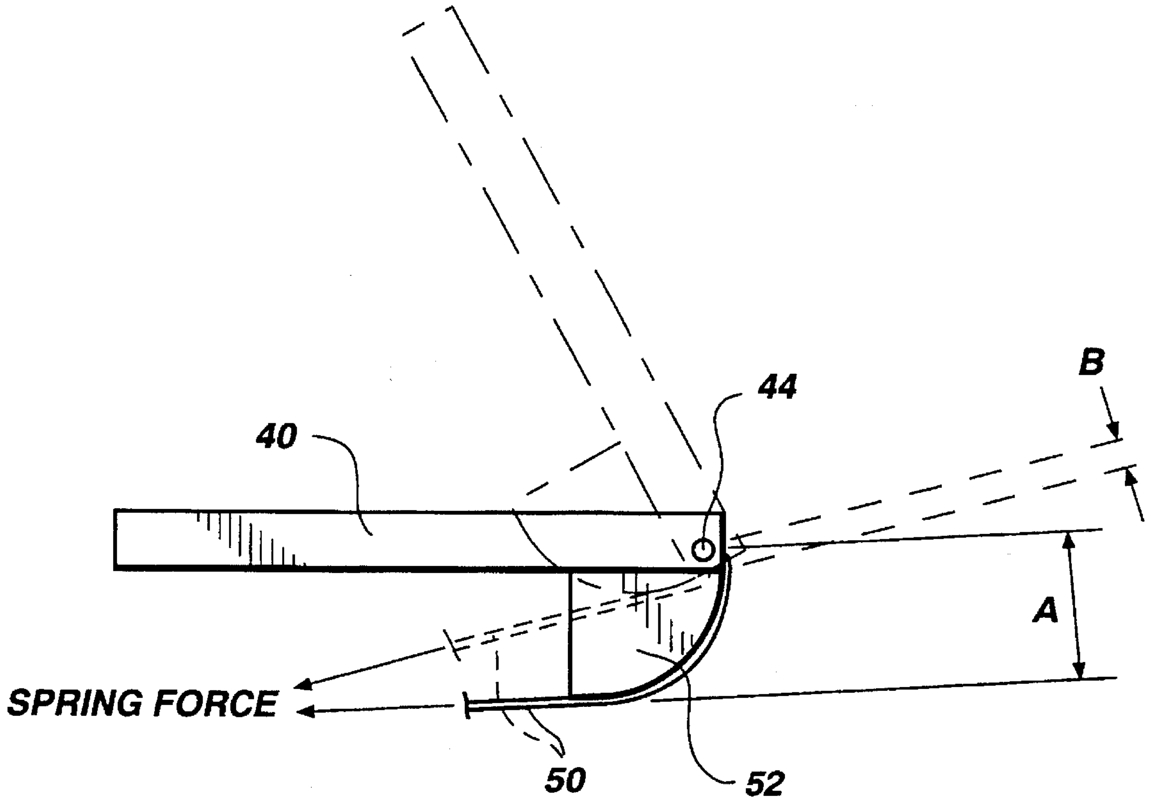
FIG. 2 is a side elevational view of the seat side support member, showing the moment arms provided by the spring tension force in the seat up-right and seat down positions.

As is more clearly shown in FIG. 2, the cables 50 act around the cams 52 to vary the torque applied to the modified seat as the seat moves from its horizontal position as shown, to its up-right position as shown in FIG. 1. This is accomplished by varying the effective moment arm (the effective distance from the pivot axle to the point on the line of spring force that is normal to the line of force) about the seat pivot axle 44 as the seat changes position. This is best shown in FIG. 2. When the modified seat 40 is in its horizontal position, the effective moment arm A is its longest. Similarly, when the seat is in its up-right position, the moment arm B is its shortest. The cam 52 is so designed that, as the modified seat 40 moves from its horizontal position to its up-right position, the moment arm about the seat pivot axles 44 accordingly decreases in relation to the-seat position angle, thereby accordingly decreasing the torque applied to the modified seat by the tension springs as the modified seat moves from its horizontal position to its up-right position. The cam, therefore, provides maximum torque (lifting force) to the seat when in its horizontal position, and decreases this torque as the seat is raised from its horizontal position to its up-right position. In this manner, the lifting force of the seat to assist in lifting the user out of the wheelchair is greatest when the most force is necessary to lift the user (when he is horizontal), and gradually decreases as the user approaches his stand-up position adjacent the wheelchair.

Figure 3:
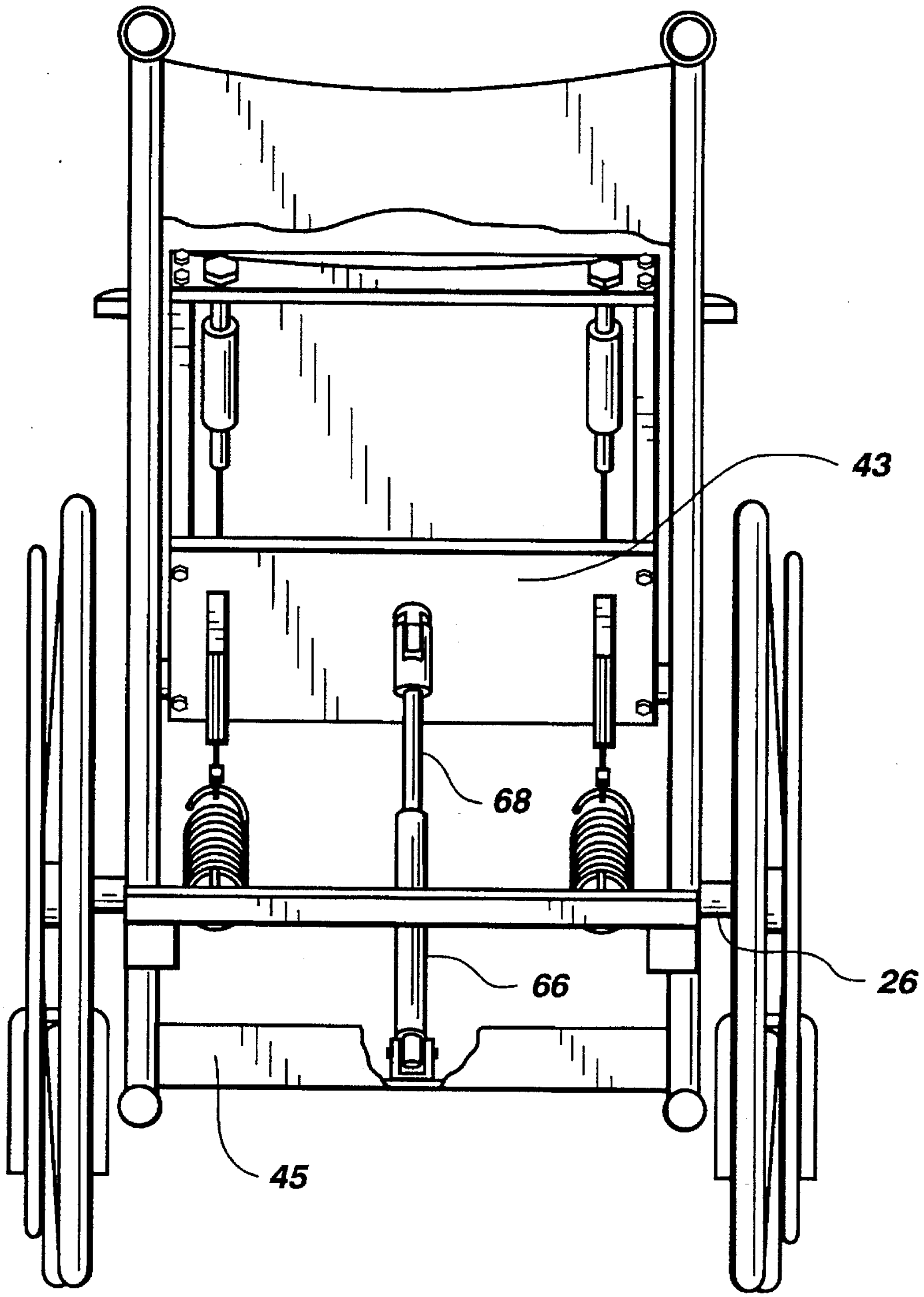
FIG. 3 is a rear elevational view taken along arrows 3—3 in FIG. 1, showing the relative positions of the springs, cables, cams, and lift control hydraulic cylinder.

As is best shown in FIGS. 1 and 3, the seat-lift wheelchair of the present invention also includes lift-control means for (1) controlling the rate of ascent of the seat, and (2) permitting the user to position (stop) the seat in any of an infinite number of positions between the horizontal position and the up-right position. This lift-control means takes the form of a hydraulic cylinder and piston mechanism 60 that is pivotally connected at its upper end to a support plate 43, and at its lower end to a transverse structural member 45. In this manner, the hydraulic cylinder 60 can regulate both the rate and amount of pivotal movement of the wheelchair modified seat 40 relative to the wheelchair frame 12.

Turning again to FIG. 1, the hydraulic cylinder and piston mechanism 60 comprises a fluid cylinder 66 having a piston (not shown) therein. The piston is connected to an actuator 68 for movement within, and adjustable extension from, the cylinder 66. The lift-control means further comprises a closed-loop hydraulic system which includes a fluid control valve 70 in fluid communication with the cylinder via a pair of fluid conduits 72. The conduits 72 are in communication with the cylinder 66 at respective locations on each side of the piston, i.e., above and below the piston, such that as the piston reciprocates within the cylinder, hydraulic fluid exits through one of the conduits 72, flows through the control valve 70, and enters the opposite end of the cylinder 66 through the other conduit 72. In this manner, movement of the piston, and therefore amount of extension of the actuator 68, can be controlled by manual actuation of the fluid control valve 70 to interrupt the flow of hydraulic fluid through the closed loop system, to thereby adjust and retain the position of the actuator 68 relative to the cylinder 66, which in turn, stabilizes the modified seat 40 in any desired position between its horizontal and up-right positions. As shown, the fluid control valve 70 is positioned just under the armrest structure 18 adjacent the front vertical frame element 16, within convenient reach of the user in either his sitting or standing position.

In the embodiment shown in FIG. 1, the fluid control valve 70 takes the form of a 3-position (OPEN-CLOSED-OPEN) toggle switch that is spring-loaded in one (the up) direction to automatically close upon release. In this manner, the user can control the seat movement during entry and exit by "pulling" the toggle upwardly toward the armrest, which opens the valve and permits fluid flow through the system. In addition, in instances when the user needs assistance in getting into the wheelchair, the assistant can shift the control valve toggle down, whereupon it locks in the down valve OPEN position, to permit the seat 40 to descend under the user's weight as the assistant helps the patient into the wheelchair.

The lift-control means also includes a fluid flow regulator valve 74 in series with one fluid conduit 72 and the fluid control valve 70. The fluid flow regulator valve 74 is a bi-directional adjustable check valve having manually adjustable flow rate control adjustments 76 for each direction of fluid flow therethrough. This permits the user to independently adjust the maximum rates of fluid flow through the system which, in turn, limits-the rates at which the modified seat rises to assist the user in getting out of the wheelchair and lowers to assist the user in getting into the wheelchair. In this manner, the user can adjust the maximum limits of the rates of wheelchair seat movement, and therefore, the speeds with which the user "stands up" and "sits down" using the wheelchair seat to assist him, to suit his personal preference. Note, again, that these fluid flow adjustments are independent of each other so the user can control the "seat raising" and "seat lowering" maximum speeds independently.

As previously described, the lift-control means permits the user to stop the modified seat in any position between the horizontal and up-right positions. He does this simply by releasing the actuator toggle on the fluid control valve 70 whenever the seat is where he wants it. This interrupts fluid flow through the system to stop the actuator 68, to thereby stop and hold the seat. Those skilled in the art will also readily appreciate that this "braking" effect operates equally well to retain the seat in its horizontal and up-right positions.

Figure 4:
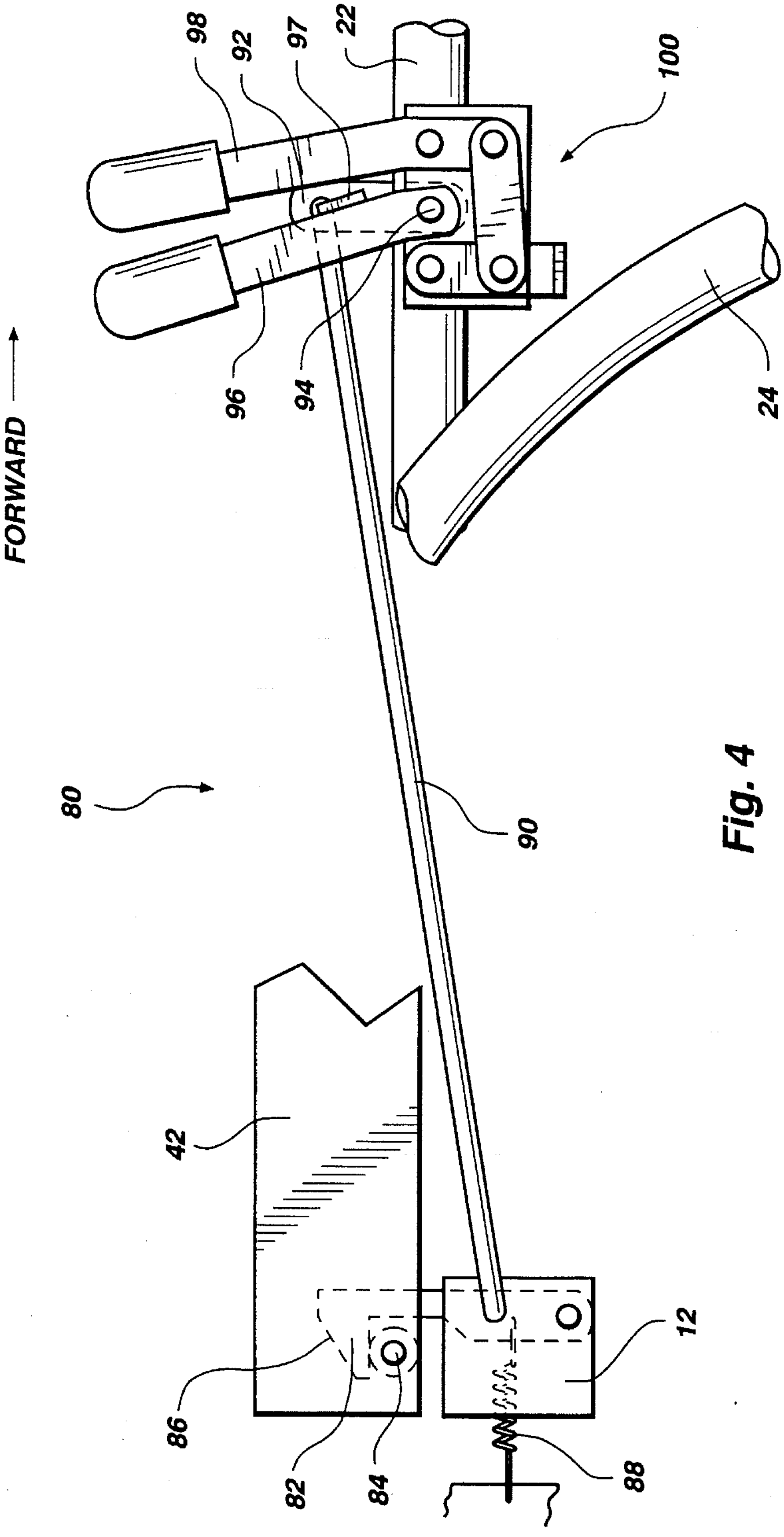
FIG. 4 is a partial side elevation view showing the details of the mechanical latch mechanism for the wheelchair seat.

Referring now to FIG. 4, notwithstanding this "fluid brake," however, the seat-lift wheelchair of the present invention includes a latch mechanism 80 for latching or otherwise locking the modified seat in its normally horizontal position. As shown in FIG. 4, this latch mechanism comprises a hook 82 pivotally mounted to the right-side frame member 12 for hooking or latching onto a latch pin 84 mounted on the inside surface of the right seat side support member 42. As shown, the hook 82 includes an inclined cam surface 86 for engaging the latch pin 84 as the modified seat shifts into its horizontal position to permit the hook to "ride" around the latch pin and then "hook" around the pin under the force of a return spring 88, in a customary manner.

The hook 82 is connected through linking rod 90 to a pivoting link 92, on the interior side of the intermediate horizontal frame member 22. The pivoting link 92 pivots at 94 with a latch release lever 96 to permit the user to manually release the hook 82 by pushing the lever 96 forward (to the right). The release lever 96 is coplanar with the brake lever 98 of a conventional drivewheel brake mechanism in order to cooperate with the brake mechanism so that the seat latch mechanism will permit the seat to release only when the drive wheel brake is engaged, and will prevent the latch mechanism from releasing the seat when the drive wheel brake is not engaged. When the wheelchair brake is not engaged (as shown), the brake lever 98 is as shown in FIG. 4, inclined toward the left, and prevents the latch release lever 96 from shifting to the right. Shifting the brake lever 98 forward (to the right) engages the drivewheel brake against the wheel 24, and also permits the latch release lever 96 to be shifted to the right, releasing the latch hook 82 from the seat 40. Additionally, of course, with the drivewheel brake engaged, the latch release lever 96 is free to shift back and forth, and specifically, to shift back to the left, as the latch hook 82 "rides around" and latches onto the latch pin 84, as the seat is lowered to its horizontal position.

An alternative design for the latch release lever 96 and brake lever 98 interface is to position the latch release lever on the interior side of the intermediate horizontal frame member 22, in place of the pivoting link 92. In this alternative design, the linking rod 90 connects directly to the latch release lever 96, which, alone, pivots at pin 94. A benefit of this design is that the latch release lever 96 would not be coplanar with the brake lever 98. This design could function better to avoid hand and finger interference with either of the levers when the other is operated independently.

In order to effect the desired results that the latch mechanism will not release the seat unless the wheelchair brake is engaged, the latch release lever 96 includes a finger 97 that engages the brake lever 98 when the latch release lever is pushed forward (to the right) to release the seat, in a manner similar to the way the brake lever prevents the latch release lever from shifting forward (to the right) unless the brake is engaged, as previously described with reference to the coplanar lever design.

OPERATION

The seat-lift wheelchair of the present invention is designed to assist the user in getting out of the wheelchair, or otherwise raise the user to a near-standing position to enable him to lean back against the chair seat while attending to other duties, e.g., preparing meals at a kitchen counter. To do this, the user first positions the wheelchair in the desired location and locks the drivewheels using the wheelchair brake mechanism, in the customary manner. As previously described, with the wheelchair drivewheels locked, the latch mechanism is now free to operate to release the seat from its horizontal position. Therefore, the user releases the seat using the latch mechanism and leans forward to shift his own center of gravity to permit torque applied to the seat by the spring-cable-cam mechanism to overcome the force of the user's weight shifting on the seat. Simultaneously, the user actuates the fluid control valve to permit hydraulic fluid flow through the system, which releases the "braking" effect of the hydraulic cylinder and piston mechanism to permit the cylinder actuator to extend and pivot the seat in the forward direction. The rate of extension of the hydraulic cylinder actuator, and therefore the rate of pivot or rise of the wheelchair seat, is controlled by the user by his previous adjustment of the fluid flow regulator valve 74. Therefore, the user can cause the seat to pivot upwardly as slowly and gently, or as rapidly (within safety constraints) as he chooses.

As previously described, the cam associated with the seat and spring cable is designed to cause the force urging the seat upwardly to gradually decrease as the seat pivots from its horizontal position to its up-right position. This is accomplished by the progressive decrease of the moment arm between the pivot point of the seat and the tangent of the spring cable on the cam surface as the seat rises. This feature, in conjunction with the decreasing spring force as the spring retracts, has the effect of decreasing both the rate with which the seat rises and the force with which the seat lifts the user as the user nears his standing-up position. Once the seat is in its up-right position, the user releases the control valve toggle, causing the seat to lock in this position, and the user may freely get out of the chair or otherwise use the wheelchair seat to lean against as he rests in a near-standing position.

To get back into the wheelchair from the seat up-right position, essentially the reverse procedure is used. Specifically, the user first leans his body against the seat then actuates the fluid control valve to permit the cylinder actuator 68 to be withdrawn into the hydraulic cylinder, again, the rate and amount of retraction of the actuator into the cylinder being controllable by the user. As the seat moves from its up-right to its horizontal position, the resistive torque applied to the seat by the spring, cable, and cam mechanism increases progressively to resist the increasing user's weight that is being transferred to the wheelchair seat. By continuing to actuate the fluid control valve, the user causes the seat to be shifted back into its horizontal position, whereupon the latch mechanism will automatically lock the seat in its horizontal position.

A novel feature of the present invention is the ability of the seat to be locked in any one of an infinite number of positions between the horizontal position and the up-right position. This is accomplished by the user's releasing (closing) the fluid control valve when the seat is in any position that he desires. Releasing the fluid control valve interrupts fluid flow within the closed system and causes the actuator to stop further movement (in either direction) within the fluid cylinder. In this manner, the user may "lock" the seat in any position between the two end positions that he desires, and the seat will remain in that position until the user "unlocks" the seat by actuating the fluid control valve to permit further fluid flow through the system. To further adjust the seat position, the user shifts the control valve toggle, and either leans forward to raise the seat or shifts his weight rearwardly against the seat to lower it, whereupon he then releases the toggle to stop the seat when it reaches his desired position.

SECOND EMBODIMENT

Figure 5:
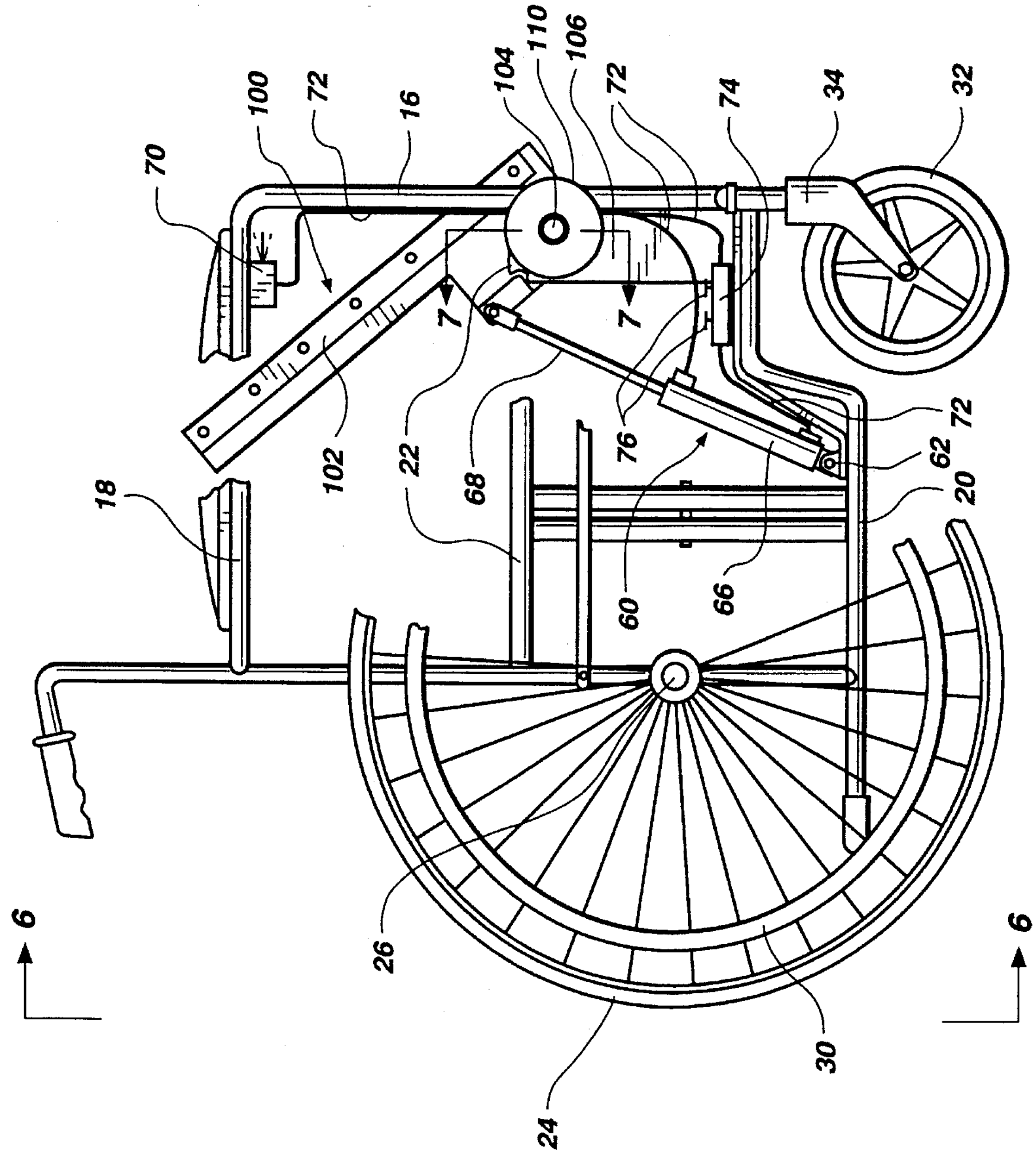
FIG. 5 is a side elevational view similar to FIG. 1, illustrating a second embodiment of the seat-lift wheelchair of the present invention.

FIG. 5 illustrates a second embodiment of the seat-lift wheelchair of the present invention. Inasmuch as the basic component parts of the wheelchair are standard, reference numerals identical to those identical parts in the description of the first embodiment will be used with reference to identical matching parts in the second embodiment, and a description of those elements will not be repeated.

The seat-lift mechanism of the second embodiment wheelchair is very similar to that of the first embodiment. It includes a modified seat 100 having symmetric side support members 102, each being pivotally connected at axle 104 to respective side frame members 12. In this embodiment, the seat pivot axle 104 is pivotally mounted in bearings or bushings (not shown in FIG. 5) in a mounting plate 106 that is attached to the side frame member, and more specifically to the front vertical elements 16, the intermediate horizontal structural member 22, and the lower horizontal structural member 20. As will be explained in greater detail hereinbelow, the use of this mounting plate 106 enables the seat-lift mechanism of the second embodiment to be easily installed, as a unit, onto conventional collapsible wheelchairs.

Figure 7:
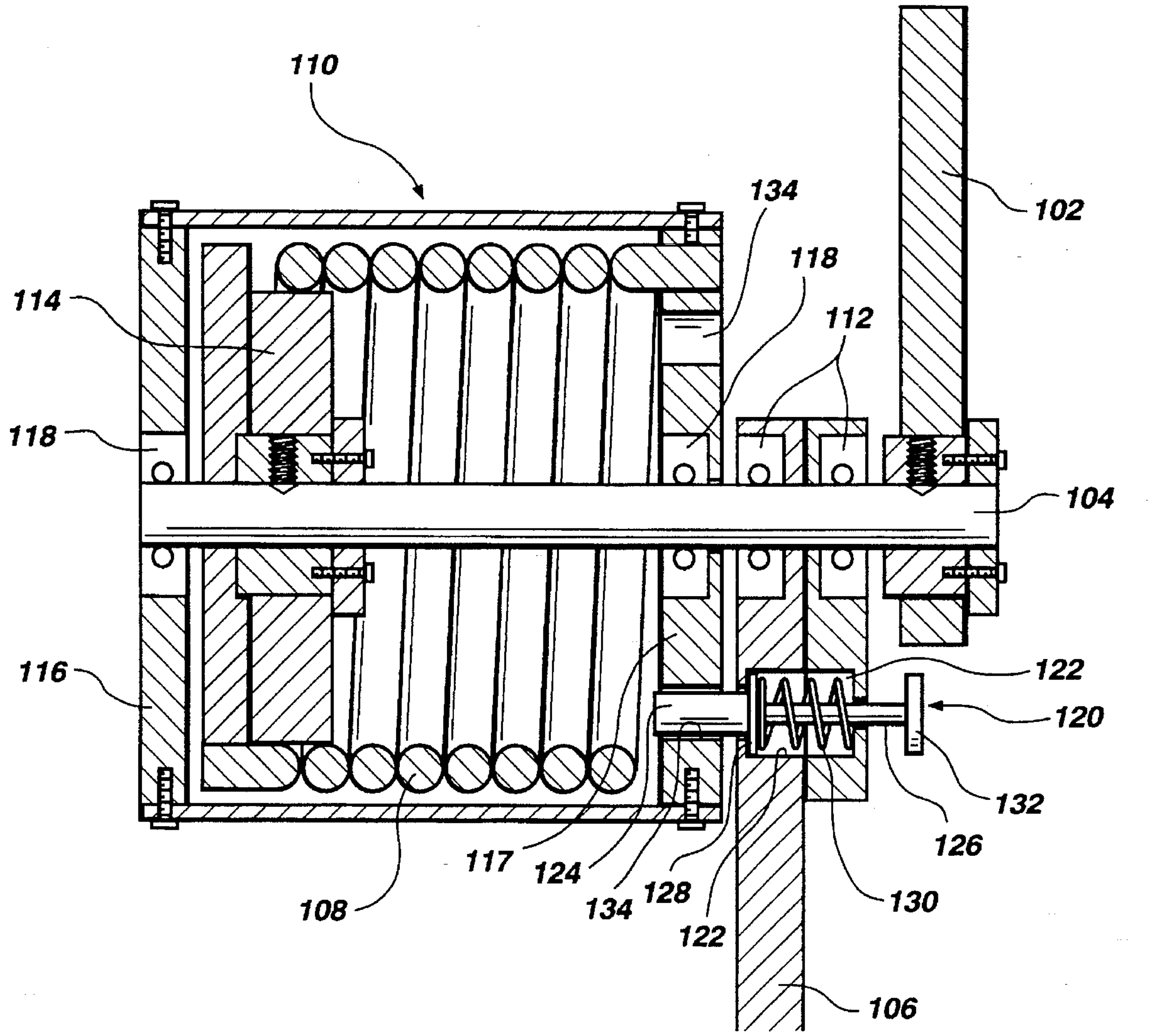
FIG. 7 is a sectional view taken along lines 7—7 in FIG. 5, illustrating the torsion spring mechanism for lifting the wheelchair seat.
Figure 8:
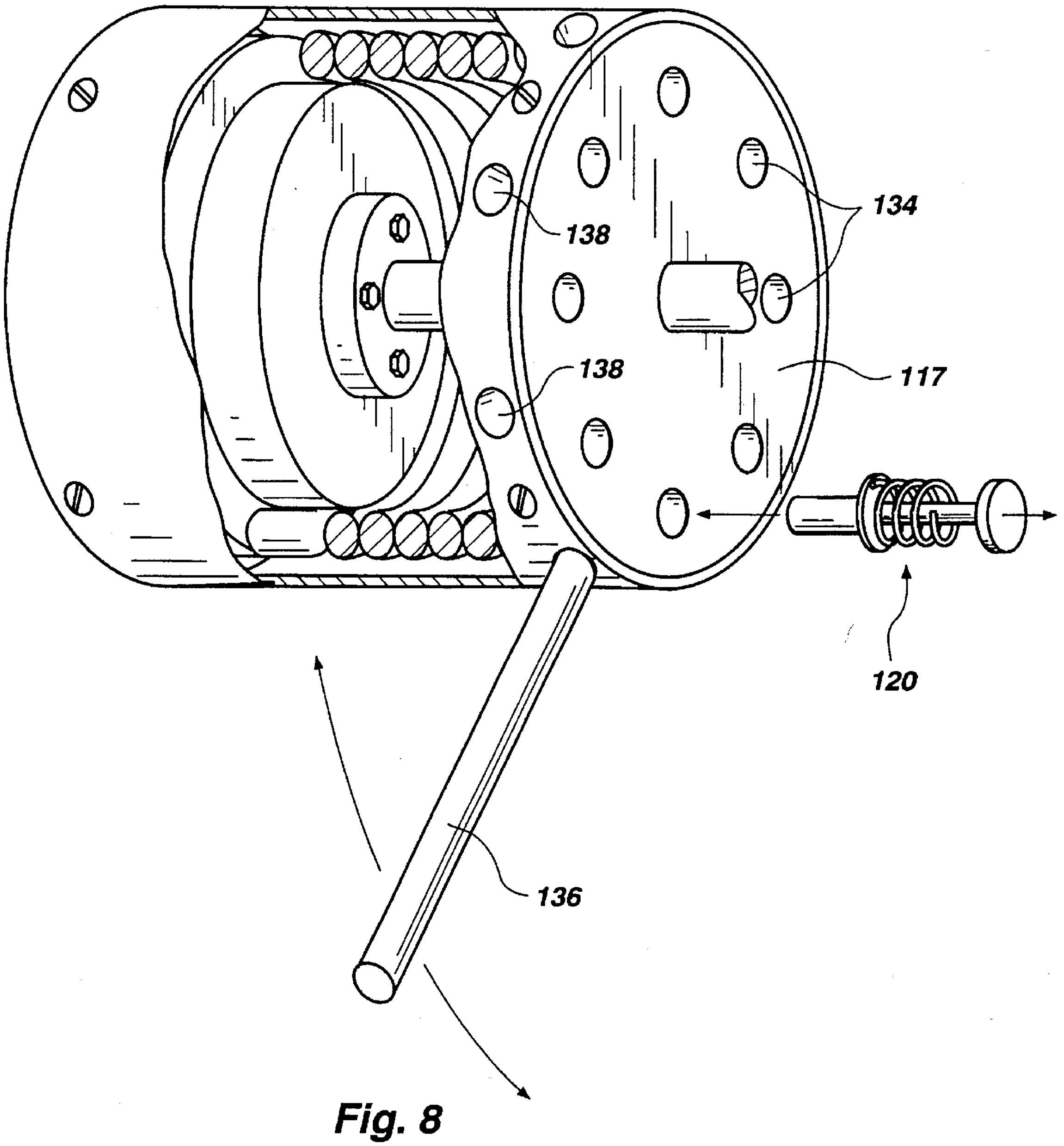
FIG. 8 is a perspective view of the spring and cannister seat-lift mechanism, illustrating the adjustability feature of the torsion seat-lift spring.

The modified seat 100 of the second embodiment is biased into its up-right position by the action of symmetric coiled torsion springs 108 more clearly shown in FIGS. 7 and 8. Each torsion spring 108 is contained within a spring housing or cannister 110 for safety purposes and for purposes of torsion adjustment, as will be explained in greater detail hereinbelow.

As best shown in FIG. 7, the seat pivot axle 104 is pivotally mounted within bearings or bushings 112 set in the mounting plate 106. The side seat support member 102 is attached to one end of the seat pivot axle 104, the other end of the axle being attached to a spring mount 114 within the spring cannister 110. The two ends of the spring cannister 110 include end plates 116, 117, each having axle bearings or bushings 118 set therein to enable the cannister to rotate about the seat pivot axle. The torsion spring 108 is attached to the cannister 110 at the end plate 117 adjacent the mounting plate 106 (right end plate as shown in FIG. 7). The opposite end of the spring 108 (the left end) is attached to the spring mount 114 within the cannister, the spring mount being mounted to the seat pivot axle 104 for rotation therewith inside and relative to the spring cannister 110, as it pivots with the seat side support member 102 relative to the mounting plate 106.

The seat-lift mechanism of the second embodiment is adapted to pivot the modified seat 100 from the horizontal position to an up-right position, as in the design of the first embodiment. This is effected by the torsion springs 108 that act through the axle 104 to urge the seat side support members 102 relative to the mounting plates 106, which are permanently attached to respective wheelchair side frame members 12o As best shown in FIG. 7, the seat pivot axle 104 pivots relative to the mounting plate 106 by the action of the torsion spring 108 acting upon the spring mount 114, which is attached to the axle 104. Therefore, the torsion spring biases the seat pivot axle 104 and the seat side support member 102 attached thereto in the rotational direction to lift the seat from its horizontal position to its up-right position. In FIG. 7, this direction is out of the page toward the reader. The "anchored" end of the torsion spring 108 is attached to the cannister (right side) end plate 117 adjacent the mounting plate 106. Axle bearings or bushings 118 in the cannister end plates 116, 117 permit the cannister to pivot relative to the seat pivot axle 104, or more accurately, permit the pivot axle to pivot relative to the cannister.

A torsion adjustment mechanism connects the cannister to the mounting plate 106 to "anchor" the torsion spring to the wheelchair side frame member in order to transfer the torsion force of the spring between the seat side support member 102 and the wheelchair frame. This adjustment mechanism permits the user to manually adjust the torsion force of the spring, and therefore the lifting force of the modified seat relative to the wheelchair frame. This torsion adjustment mechanism comprises a spring-loaded adjustment pin 120 set within a spring housing 122 within the mounting plate 106. The adjustment pin 120 is a stepped diameter pin, having a primary diameter at 124 and a reduced diameter 126, which carries a washer 128 and compression spring 130, which biases the washer, and thus the pin 120 outward from the mounting plate (to the left as shown in FIG. 7). The adjustment pin 120 includes a head 132 for manually grasping and pulling the pin out of engagement with the cannister end plate 117. As shown, the right-side cannister end plate 117 includes a plurality of adjustment pin holes 134 for receiving the adjustment pin in order to "lock" the cannister against rotation relative to the mounting plate 106 and wheelchair side frame member.

FIG. 8 more clearly illustrates the torsion force adjustment mechanism. The seat side support member and mounting plate have been omitted for clarity. To adjust the force of the torsion spring, the adjuster first positions the modified seat in its up-right position, then inserts an adjustment rod or handle 136 into one of a plurality of handle holes 138, and prepares to oppose the reactive force on the cannister when he removes the adjustment pin 120. In this embodiment, he prepares to oppose an upward force on the adjustment handle by preparing to press downwardly on the handle. He then pulls the pin 120 back (to the right) from its resting place in one of the adjustment holes 134 in the adjacent cannister end plate 117 after first relieving the binding force on the pin in a typical manner, as in by oscillating the cannister with the adjustment handle 136. With the pin 120 retracted, the-adjuster can rotate the cannister either way to vary-the lifting force on the seat (down to increase the lifting force, up to decrease it). When the cannister is in the approximate desired position, the adjuster releases the pin and oscillates the cannister until the pin "locates" the correct adjustment hole and then "snaps" into it.

The adjuster then adjusts the seat lifting force on the opposite cannister following the same procedure. In this regard, the cannisters 110 are graduated to indicate relative torques, body weights, or other indicia for approximating the desired adjustment and for equalizing both spring adjustments.

As shown in FIG. 5, the second embodiment of the seat-lift wheelchair of the present invention also includes a lift-control means that is essentially identical to that of the first embodiment, and therefore will not be repeated in detail, except that this lift-control means of FIG. 5 includes a separate hydraulic cylinder and piston mechanism 60 pivotally connected to each seat side support member and side frame member, the fluid conduits 72, the fluid control valve 70, and the fluid flow regulator valve 74, defining the closed-loop hydraulic system for permitting the user to control the position and movement of the wheelchair seat, as in the first embodiment.

As has been indicated previously, this second embodiment is designed to be a collapsible wheelchair, similar to customary collapsible wheelchairs. Therefore, as previously described, the seat-lift components of this second embodiment are positioned and oriented essentially within the vertical planes of the side frame members 12 in order to avoid or at least minimize any interference between the seat-lift components and either the wheelchair per se or the seat-lift components of the opposite side frame member. In this regard, note that the original scissor collapse mechanism is not affected by the addition of the seat-lift components. In addition, the springs and cannisters 108, 110 are outboard of the side frame members 12 in order to avoid any interference when the wheelchair is fully collapsed.

Figure 6:
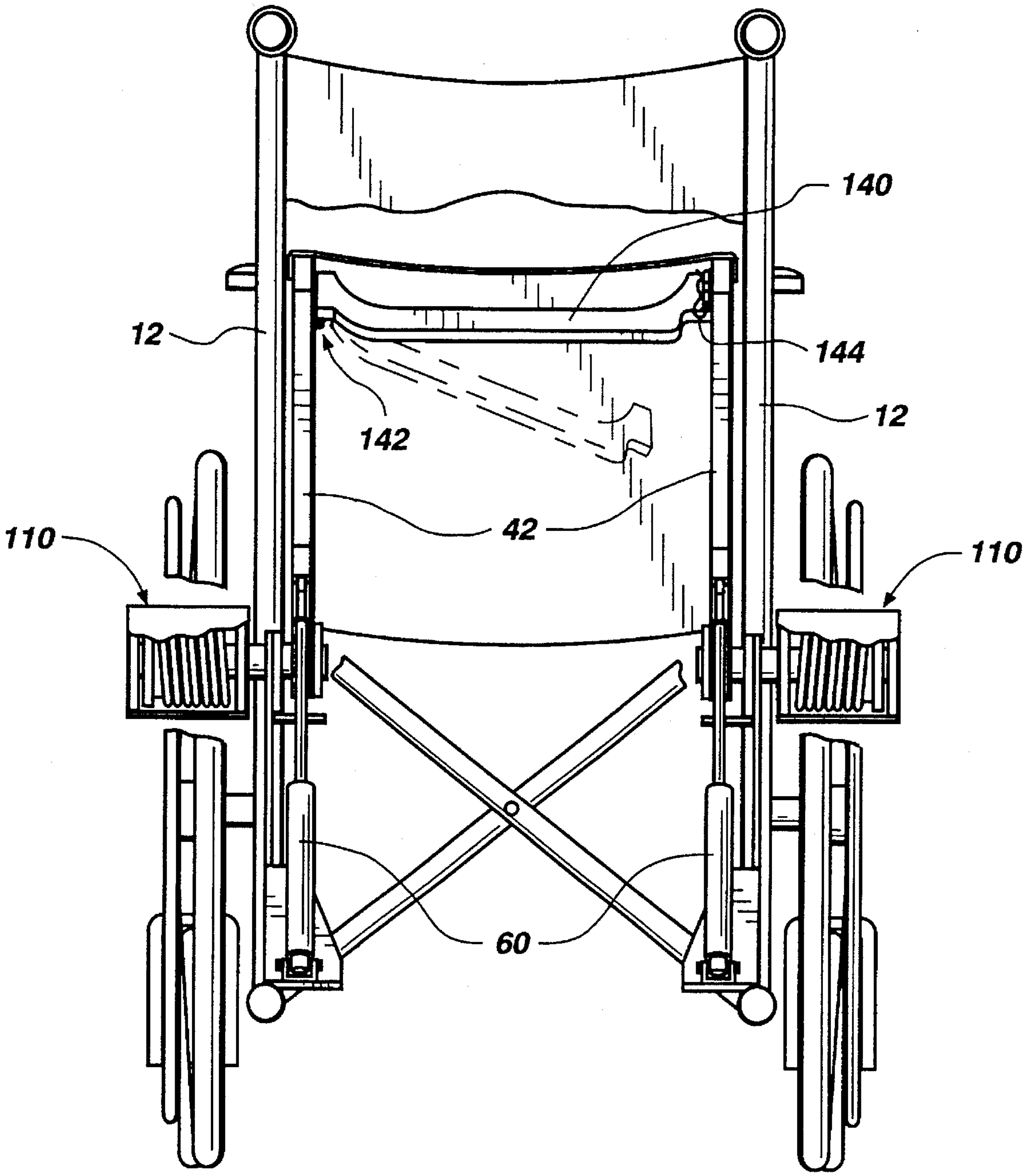
FIG. 6 is a rear elevational view similar to FIG. 3, illustrating the relative positions of the seat-lift springs, wheelchair frame, seat side support members, hydraulic cylinders and seat cross-brace.

FIG. 6 illustrates the symmetric positioning of the elements that define the seat raising and controlling mechanism more clearly. Specifically, the torsion springs and cannisters 110 are positioned outboard of the wheelchair side frame members 12 in order to enable the wheelchair to be collapsed in the conventional manner without interference from the cannisters. Likewise, the hydraulic cylinders 60 are positioned immediately inboard of the side frame members 12, essentially in axial alignment with the seat side support members 42 in order to (1) operate in direct axial alignment with their respective pivotal connections to the seat side support members, and (2) minimize the amount of interference therebetween as the wheelchair is collapsed in the customary manner.

FIG. 6 also illustrates the rear crossbrace 140 for the modified seat and its hinge connection at 142 to the left-side seat side support member that enables it to (1) maintain the seat side support members parallel as the modified seat is moved between its horizontal and up-right positions, and (2) enable the modified seat to collapse inwardly with the wheelchair side frame members in the customary manner. The rear crossbrace 140 is designed to swing down adjacent the left seat side support member 42 for collapsing, and swing up to connect with the rear portion of the right seat side support member for maintaining the side seat members parallel during use. A hairpin 144 is used to attach the crossbrace to the right seat member.

Figure 9:
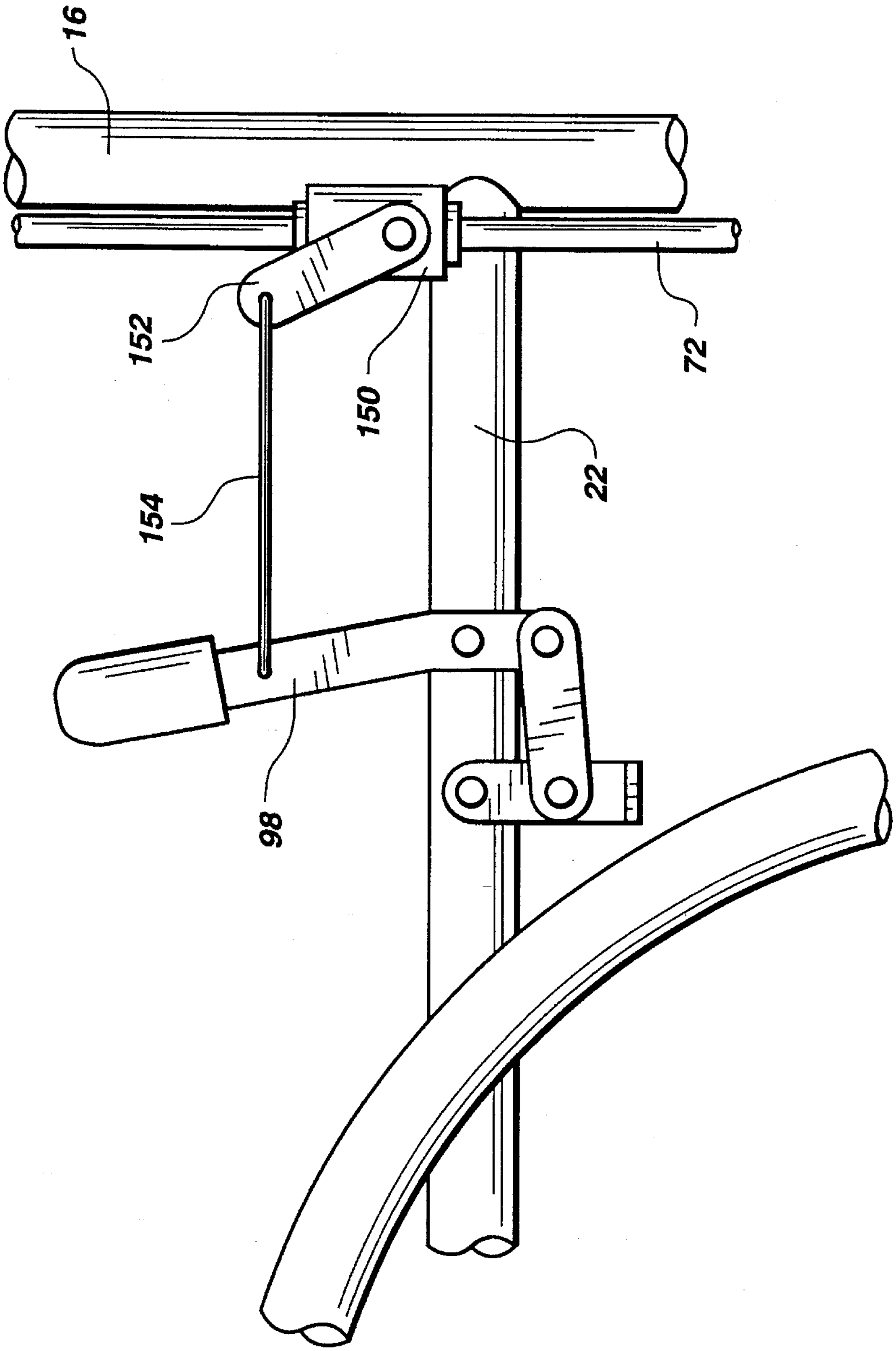
FIG. 9 is a partial side elevation view showing the details of the hydraulic lock mechanism for the wheelchair seat.

FIG. 9 illustrates a "seat brake" connected to the wheelchair mechanical brake that operates to prevent movement of the seat unless the wheelchair brake is set against the drive wheel, or conversely stated, to permit seat movement only when the-wheel brake is applied. This seat brake comprises a fluid valve 150 in communication with the fluid conduits 72, and in series with the control valve 70 and flow regulator valve 74. The fluid valve 150 is physically attached to the right-hand side frame member 12 adjacent the intermediate horizontal member 22, conveniently in-line with the fluid conduit 72 that runs up the front frame element 16 to the fluid actuator control valve (not shown in FIG. 9). The fluid valve 150 includes an actuator lever 132 that is connected to the brake lever 98 by a linking rod 154 in a manner that, when the brake is not engaged (the brake lever and valve actuating rod are urged to the left in FIG. 9), fluid flow through the valve 140 is interrupted, and when the brake is engaged (the brake lever and valve actuating rod are urged to the right in FIG. 9), the valve is open to fluid flow therethrough. In this manner, the fluid valve 150 serves as a "seat brake" to prevent the seat from moving or otherwise "being adjusted" unless the wheelchair drive wheel brake is fully engaged.

Figure 10:
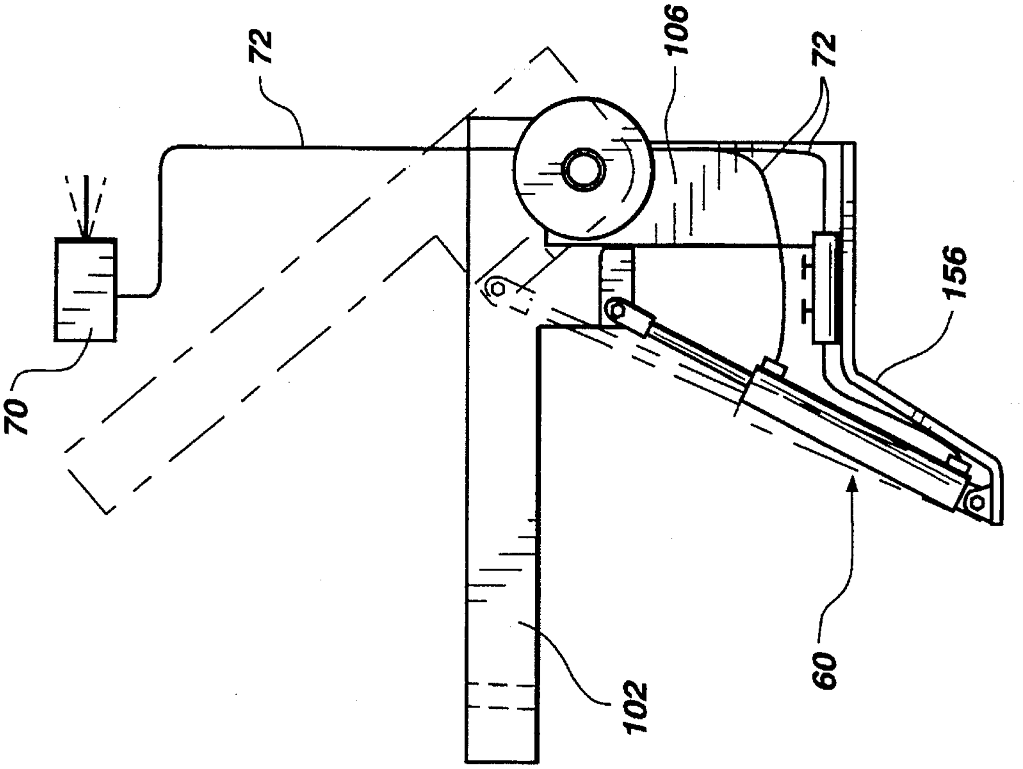
FIG. 10 is a side elevational view of the second embodiment seat-lift mechanism and components that can be retrofitted to conventional collapsible wheelchairs to convert same into collapsible seat-lift wheelchairs.

It is anticipated that the seat-lift wheelchair of the second embodiment will be commercialized in two forms: (1) in the form shown in FIGS. 5 and 6 (a complete collapsible seat-lift wheelchair), and (2) in a kit- or retrofit-form, comprising the seat-lift components, including the seat side support members, to be retrofitted onto a conventional collapsible wheelchair to result in a wheelchair as shown in FIGS. 5 and 6. In this regard, FIG. 10 illustrates the various seat-lift components that are retrofitted onto a conventional collapsible wheelchair in order to convert same into a collapsible seat-lift wheelchair of the present invention. These seat-lift components have previously been described with regard to the second embodiment of FIGS. 5–9, and will not be repeated.

The components shown in FIG. 10 are designed to retrofit a conventional collapsible wheelchair, and are fully assembled into assemblies that are easily mounted into the side frame members of conventional wheelchairs. As in the second embodiment described with reference to FIGS. 5–9, the seat lift components are mounted on the mounting plate 106 which is attached to the wheelchair side frame member 12. The mounting plate includes an extension 156 for supporting the lower end of the hydraulic cylinder and piston 60. The mounting plate extension 156 is designed to conform to the shape of the lower horizontal structural piece of the wheelchair frame. In this manner, the hydraulic cylinder does not require a separate support or mounting bracket attached to the wheelchair frame. Rather, the entire unit shown in FIG. 10 may simply be installed in the wheelchair following removal of the original fabric seat. The assembly shown in FIG. 10 is for the right side of the wheelchair. A mirror or symmetric assembly, of course, attaches to the left side of the wheelchair, except for the fluid conduits 72, which are inter-connected following installation, to a single fluid control valve 70 for permitting the user to, of course, control the lift of both the left and right side seat support members simultaneously.

THIRD EMBODIMENT

Figure 11:
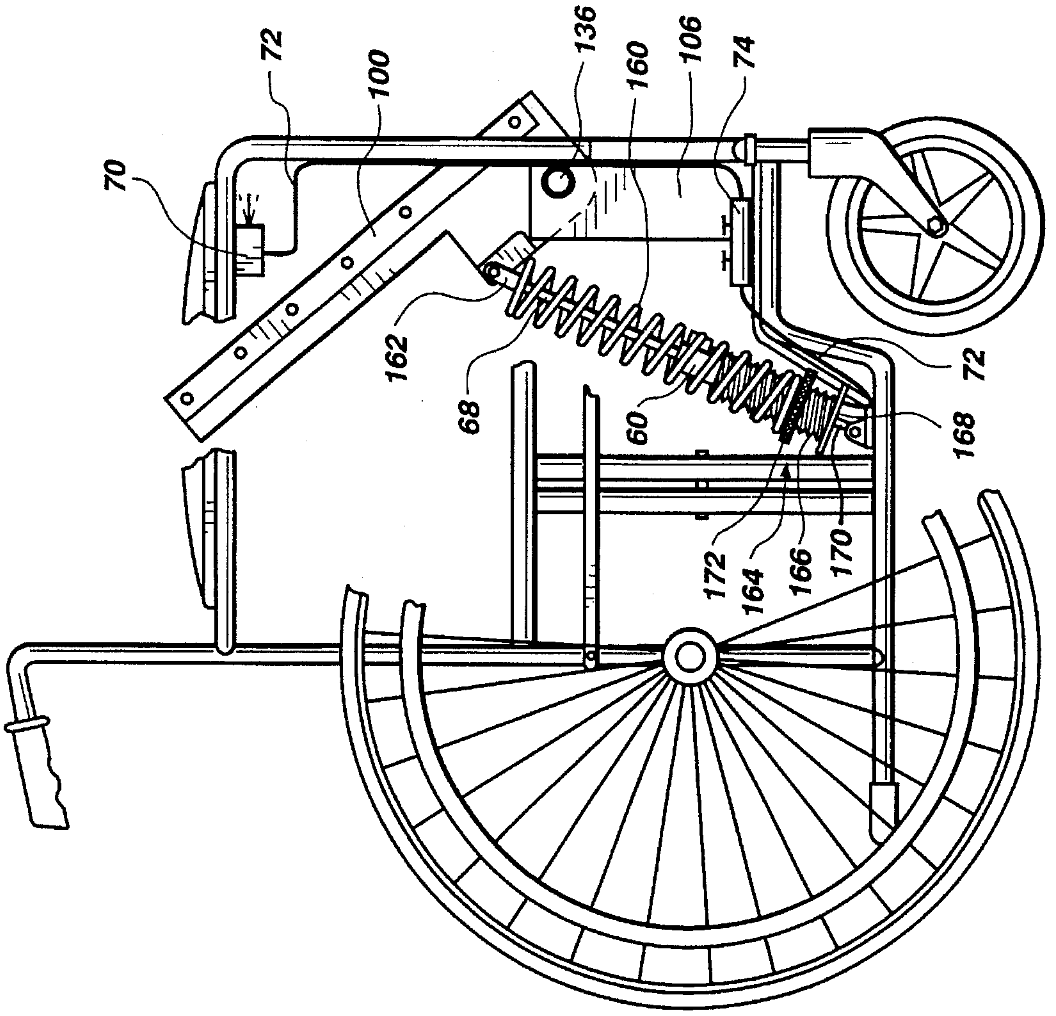
FIG. 11 is a side elevational view similar to FIGS. 1 and 5, showing a third embodiment of the seat-lift wheelchair of the present invention.

FIG. 11 illustrates a third embodiment of the seat-lift wheelchair of the present invention. This third embodiment is essentially identical to the second embodiment, except for the seat-lift springs. In this third embodiment, a coil compression spring 160 replaces the torsion spring, and is mounted directly on and over the hydraulic cylinder 60, the ends of the compression spring being fitted into respective upper and lower spring mounts 162, 164 that are connected to respective upper and lower ends of the hydraulic cylinder 60 and actuator 68.

Inasmuch as the third embodiment of FIG. 11 does not utilize coiled torsion springs or the spring cannisters, the seat pivot axle 136 is made much shorter, terminating essentially with the outside surface of the mounting plate 106, and retained for pivotal movement within the mounting plate bearings 112 in a customary manner. In all other aspects, the third embodiment is identical to the second embodiment, the only difference being the type and location of the seat-lifting springs.

The upper spring mount 162 is a conventional stationary mount for mounting the spring end about the hydraulic cylinder actuator. The lower spring mount 164, however, is an adjustable mount for pre-compressing the spring 160 to alter its range of force against the modified seat 100. The lower spring mount 164 comprises an externally threaded cylinder 166 having a closed end 158 that attaches to the threaded extension 170 of the hydraulic cylinder 60, with the hydraulic cylinder fitting inside of the lower spring mount. An externally knurled adjusting nut 172 travels along the external threads and retains the lower end of the spring 160 in adjustable relation around the hydraulic cylinder. The user adjusts the compression force of the springs 160 by positioning this adjusting nut on the threaded cylinder 166 in a customary manner. The closed end 168 of the adjustable lower spring mount includes a passageway (not shown) for the fluid conduits 72, both of which exit the spring mount adjacent the bottom of the cylinder 60.

The operation of the third embodiment seat-lift wheelchair is identical to that of the first and second embodiments.

Figure 12:
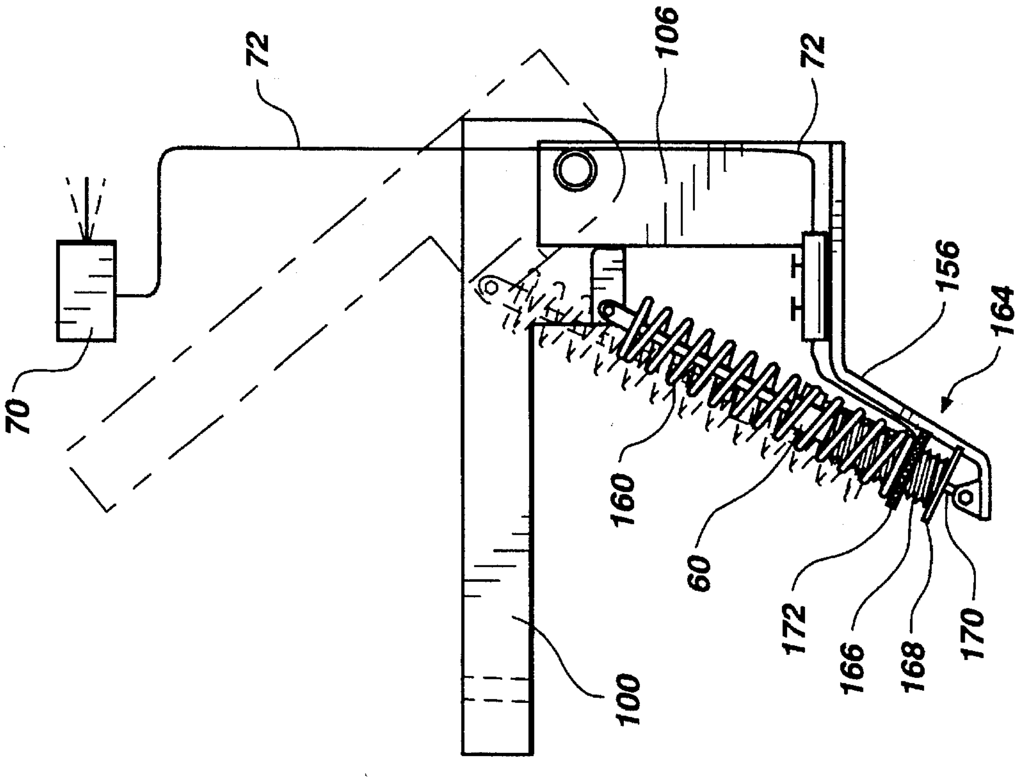
FIG. 12 is a side elevational view similar to FIG. 10, of the third embodiment seat-lift mechanism and components that can be retrofitted to conventional collapsible wheelchairs to convert same into collapsible seat-lift wheelchairs.

As in the second embodiment of FIGS. 5–9, the third embodiment seat-lift wheelchair may be commercialized in the forms of (1) a complete collapsible seat-lift wheelchair (FIG. 11), and (2) a seat-lift retrofit kit (shown in FIG. 12). This retrofit kit is essentially identical to the kit of FIG. 10, except for the seat-lift springs. As shown, the retrofit kit of FIG. 12 incorporates the coil compression springs 160 and associated adjustment mechanisms, as shown in FIG. 11, to replace the torsion springs and cannisters. In all other aspects, the kit of FIG. 12 is identical to, and is retrofitted onto a conventional collapsible wheelchair in the same manner as, the kit of FIG. 10.

From the foregoing it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

What is claimed is:

1. A seat-lift wheelchair, comprising:

a pair of side frame members;

a generally planar and generally vertical back connected between said frame members;

a generally planar seat having first and second side support members pivotally connected to respective side frame members;

first and second drive wheels rotatably connected to respective side frame members;

first and second support wheels rotatably mounted on respective side frame members; and seat-lift means mounted with said frame members and with said seat for mechanically raising said seat and an occupant seated therein from a sitting position to an up-right position, said seat-lift means comprising first and second springs connected between respective side frame members and respective seat side support members; and manually controllable lift control means for controlling the rate of ascent and descent of said seat, and for stopping said seat between the sitting position and the up-right position.

2. A-seat-lift wheelchair as set forth in claim 1, wherein said lift control means comprises a closed-loop hydraulic system comprising first and second hydraulic cylinders mounted between respective side frame members and seat side support members, and liquid control means for manually controlling the rate of extension and retraction of said hydraulic cylinders, and for controlling the amount of extension of said hydraulic cylinders.

3. A seat-lift wheelchair as set forth in claim 2, wherein said liquid control means comprises a liquid control valve in communication with said hydraulic cylinders for controlling and interrupting liquid flow through said hydraulic cylinders.

4. A seat-lift wheelchair as set forth in claim 3, wherein said liquid control means further comprises a liquid flow rate control valve in communication with said hydraulic cylinder for controlling the rate of liquid flow through said hydraulic cylinders.

5. A seat-lift wheelchair as set forth in claim 4, wherein said liquid flow rate control valve is manually adjustable.

6. A seat-lift wheelchair as set forth in claim 4, wherein said liquid flow rate control valve is bi-directional.

7. A seat-lift wheelchair as set forth in claim 1, further comprising a latch mechanism for releasably retaining said seat in the sitting position.

8. A seat-lift wheelchair as set forth in claim 1, wherein said first and second springs are torsion springs, each connected to a respective side frame member at one end thereof, and to a respective torsion axle at the other end thereof, and wherein respective said torsion axles are mounted to respective seat side support members.

9. A seat-lift wheelchair as set forth in claim 2, wherein said first spring, seat side support member and hydraulic cylinder are independent of said respective second spring, seat side support member, and hydraulic cylinder.

10. A seat-lift wheelchair as set forth in claim 1, wherein said first and second springs are coiled compression springs, each connected to a respective side frame member at one end thereof and to a respective seat side support member at the other end thereof.

11. A retrofit kit for a wheelchair having a pair of side frame members, to convert same into a seat-lift wheelchair, said kit comprising:

first and second mounting plates attachable to respective side frame members;

first and second seat side support members pivotally connected to respective mounting plates;

first and second springs connected between respective mounting plates and seat side support members for mechanically raising said seat and an occupant seated therein from a sitting position to an up-right position;

seat-lift control means for controlling the rate of ascent and descent of said seat, and for stopping said seat between its sitting and up-right positions.

12. A retrofit kit as set forth in claim 4, wherein said lift control means comprises a closed-loop hydraulic system comprising first and second hydraulic cylinders mounted between respective mounting plates and seat side support members, and liquid control means for manually controlling the rate of extension and retraction of said hydraulic cylinders, and for controlling the amount of extension of said hydraulic cylinders.

13. A retrofit kit as set forth in claim 12, wherein said liquid control means comprises a liquid control valve in communication with said hydraulic cylinders for controlling and interrupting liquid flow through said hydraulic cylinders.

14. A retrofit kit as set forth in claim 13, wherein said liquid control means further comprises a liquid flow rate control valve in communication with said hydraulic cylinder for controlling the rate of liquid flow through said hydraulic cylinders.

15. A retrofit kit as set forth in claim 14, where said liquid flow rate control valve is manually adjustable.

16. A retrofit kit as set forth in claim 14, wherein said liquid flow rate control valve is bi-directional.

17. A retrofit kit as set forth in claim 12, wherein said first spring, seat side support member and hydraulic cylinder are independent of said respective second spring, seat side support member, and hydraulic cylinder.

18. A retrofit kit as set forth in claim 11, wherein said first and second springs are torsion springs, each connected to a respective mounting plate at one end thereof, and to a respective torsion axle at the other end thereof, and wherein respective said torsion axles are mounted to respective seat side support members.

19. A retrofit kit as set forth in claim 11, wherein said first and second springs are coiled compression springs, each connected to a respective mounting plate at one end thereof and to a respective seat side support member at the other end thereof.

20. A seat-lift wheelchair, comprising:

a pair of side frame members;

a generally planar and generally vertical back connected between said frame members;

a generally planar seat having first and second side support members pivotally connected to respective side frame members;

first and second drive wheels rotatably connected to respective side frame members;

first and second support wheels rotatably mounted on respective side frame members; and seat-lift means mounted with said frame members and with said seat for mechanically raising said seat and an occupant seated therein from a sitting position to an up-right position, said seat-lift means comprising first and second springs connected between respective side frame members and respective seat side support members; and manually controllable lift control means for controlling the rate of ascent and descent of said seat, and for stopping said seat between the sitting position and the up-right position, said lift control means comprising a closed-loop hydraulic system comprising first and second hydraulic cylinders mounted between respective side frame members and seat side support members, and liquid control means for manually controlling the rate of extension and retraction of said hydraulic cylinders, and for controlling the amount of extension of said hydraulic cylinders, said liquid control means comprising a liquid control valve in communication with said hydraulic cylinders for controlling and interrupting liquid flow through said hydraulic cylinders, and a liquid flow rate control valve in communication with said hydraulic cylinder for controlling the rate of liquid flow through said hydraulic cylinders.

21. A seat-lift wheelchair, comprising:

a pair of side frame members;

a generally planar and generally vertical back connected between said frame members;

a generally planar seat having first and second side support members pivotally connected to respective side frame members;

first and second drive wheels rotatably connected to respective side frame members;

first and second support wheels rotatably mounted on respective side frame members; and seat-lift means mounted with said frame members and with said seat for mechanically raising said seat and an occupant seated therein from a sitting position to an up-right position, said seat-lift means comprising first and second coiled tension springs, each connected between a respective side frame member and seat side support member via a cam mechanism that permits gradual decrease of the torque applied to respective seat side support members as said seat is urged from its sitting position to its up-right position; and manually controllable lift control means for controlling the rate of ascent and descent of said seat, and for stopping said seat between the sitting position and the up-right position.

22. A retrofit kit for a wheelchair having a pair of side frame members, to convert same into a seat-lift wheelchair, said kit comprising:

first and second mounting plates attachable to respective side frame members, first and second seat side support members pivotally connected to respective mounting plates, first and second springs connected between respective mounting plates and seat side support members, seat-lift controls means for controlling the rate of ascent of said seat, and for stopping said seat between its sitting and up-right positions, said lift control means comprising a closed-loop hydraulic system comprising first and second hydraulic cylinders mounted between respective mounting plates and seat side support members, and liquid control means for manually controlling the rate of extension and retraction of said hydraulic cylinders, and for controlling the amount of extension of said hydraulic cylinders, said liquid control means comprising a liquid control valve in communication with said hydraulic cylinders for controlling and interrupting liquid flow through said hydraulic cylinders; and a liquid flow rate control valve in communication with said hydraulic cylinder for controlling the rate of liquid flow through said hydraulic cylinders.

23. A retrofit kit for a wheelchair having a pair of side frame members, to convert same into a seat-lift wheelchair, said kit comprising:

first and second mounting plates attachable to respective side frame members, first and second seat side support members pivotally connected to respective mounting plates, first and second coiled tension springs, each connected between a respective mounting plate and seat side support member via a cam mechanism that permits gradual decrease of the torque applied to respective seat side support members as said seat is urged from its sitting position to its up-right position, seat-lift controls means for controlling the rate of ascent of said seat, and for stopping said seat between its sitting and up-right positions.

24. A seat-lift wheelchair, comprising:

a pair of side frame members;

a generally planar and generally vertical back connected between said frame members;

a generally planar seat having first and second side support members pivotally connected to respective side frame members;

first and second drive wheels rotatably connected to respective side frame members;

first and second support wheels rotatably mounted on respective side frame members; and seat-lift means mounted with said frame members and with said seat for mechanically raising said seat and an occupant seated therein from a sitting position to an up-right position, said seat-lift means comprising:

first and second torsion axles mounted to respective seat side support members; and first and second torsion springs, each adjustably connected to a respective side frame member at one end thereof, and to a respective torsion axle at the other end thereof; and manually controllable lift control means for controlling the rate of ascent and descent of said seat, and for stopping said seat between the sitting position and the up-right position.

25. A seat-lift wheelchair, comprising:

a pair of side frame members;

a generally planar and generally vertical back connected between said frame members;

a generally planar seat having first and second side support members pivotally connected to respective side frame members;

first and second drive wheels rotatably connected to respective side frame members;

first and second support wheels rotatably mounted on respective side frame members;

seat-lift means mounted with said frame members and with said seat for mechanically raising said seat and an occupant seated therein from a sitting position to an up-right position, said seat-lift means comprising first and second coiled compression springs, each adjustably connected to a respective side frame member at one end thereof and to a respective seat side support member at the other end thereof; and manually controllable lift control means for controlling the rate of ascent and descent of said seat, and for stopping said seat between the sitting position and the up-right position.

26. A seat-lift wheelchair, comprising:

a pair of side frame members;

a generally planar and generally vertical back connected between said frame members;

a generally planar seat having first and second side support members pivotally connected to respective side frame members;

first and second drive wheels rotatably connected to respective side frame members;

first and second support wheels rotatably mounted on respective side frame members;

seat-lift means mounted with said frame members and with said seat for mechanically raising said seat and an occupant seated therein from a sitting position to an up-right position, said seat-lift means comprising first and second coiled tension springs, each connected between a respective side frame member and seat side support member via a cam mechanism that permits gradual decrease of the torque applied to respective seat side support members as said seat is urged from its sitting position to its up-right position; and manually controllable lift control means for controlling the rate of ascent and descent of said seat, and for stopping said seat between the sitting position and the up-right position.

27. A retrofit kit for a wheelchair having a pair of side frame members, to convert same into a seat-lift wheel chair said kit comprising:

first and second mounting plates attachable to, respective side frame members;

first and second seat side support members pivotally connected to respective mounting plates;

first and second torsion axles mounted to respective seat side support members;

first and second torsion springs, each adjustably connectable to respective side frame member at one end thereof and to a respective torsion axle at the other end thereof; and seat-lift control means for controlling the rate of ascent and descent of said seat, and for stopping said seat between a sitting position and an up-right position.

28. A retrofit kit for a wheelchair having a pair of side from members, to convert same into a seat-lift wheelchair, said kit comprising:

first and second mounting plates attachable to respective side frame members;

first and second seat side support members pivotally connected to respective mounting plates;

first and second coiled compression springs, each adjustably connectable to a respective side frame member at one end thereof and to a respective seat side support member at the other end thereof; and seat-lift control means for controlling the rate of ascent and descent of said seat, and for stopping said seat between a sitting position and an up-right position.

29. A retrofit kit for a wheelchair having a pair of side frame members, to convert same into a seat-lift wheelchair, said kit comprising;

first and second mounting plates attachable to respective side frame members;

first and second seat side support members pivotally connected to respective mounting plates;

first and second coiled tension springs, each connectable between a respective side frame member and seat side support member via a cam mechanism that permits gradual decrease of the torque applied to respective seat side support members as said seat is urged from a sitting position to an up-right position; and seat-lift control means for controlling the rate of ascent and descent of said seat, and for stopping said seat between the sitting position and the up-right position.

* * * * *